(12) United States Patent
Bacon

(10) Patent No.: X9145
(45) Date of Patent: Oct. 10, 1835

(54) CHURN, PROPELLING BY WEIGHTS

(76) Inventor: Asahel Bacon

United States Patent

Patent No.: X9145

Ashael Bacon
Letters Patent

The Schedule referred to in these Letters Patent and making part of the same containing a description in the words of the said Ashael Bacon himself of his improvement in the Churn to be propelled by weights

---

To all to whom these presents shall come. Be it known that I Ashael Bacon of the Town of Windsor, County of Broome and State of New York have invented a new and useful machine which is called the "Gravitating Churn" & that the following is a full and exact description thereof. A frame nearly square of suitable dimensions & strength to receive and support the machinery or gearings and the weight or weight or weights sufficient to propell said machinery. That is. Two large wheels which are geared to two smaller wheels or pinions whose diameter is about equal to one length of that of the large wheels. The wheels are placed upon shafts so as to double gear from the first to the last wheel to which or its shafts is attached a crank connected with a pendulum by a pitman which gives motion to a churn placed on the top of the pendulum & which moves on a pivot or gudgeon passing through the pendulum below the churn. or in another mode by attaching a balance beam to the frame one end of which is connected with a pitman and by the pitman to the crank and the other end to a dasher or both to be propelled by weight attached to a cord which winds around the shaft of the first wheel. For a farther illustration of my invention I refer to the model and drawing of the same deposited in the Patent Office. The part or parts which I claim as my invention and not previously known in the above described machine is the propelling of the vibrating and dasher churns by means of a weight or weights attached to a gearing of cog. belt or band wheels or all of them thereby giving motion to the pendulum or dasher or both of them by means of a pitman in the mode above described Ashael Bacon Witnesses
Oliver Griggs
Addison M^c Kee
392 [illegible]

Ex
[illegible]